Dec. 17, 1935.      A. J. WENDLING      2,025,007
DRIVING BELT
Filed Sept. 18, 1933      2 Sheets-Sheet 1

INVENTOR
ALFRED J. WENDLING

BY

ATTORNEYS

Dec. 17, 1935.  A. J. WENDLING  2,025,007
DRIVING BELT
Filed Sept. 18, 1933   2 Sheets-Sheet 2

INVENTOR
ALFRED J. WENDLING
BY
ATTORNEYS

Patented Dec. 17, 1935

2,025,007

UNITED STATES PATENT OFFICE 2,025,007

DRIVING BELT

Alfred J. Wendling, Huntington Park, Calif., assignor of sixty one-hundredths to Curt Uschmann, Huntington Park, Calif.

Application September 18, 1933, Serial No. 689,813

10 Claims. (Cl. 74—236)

This invention relates to driving belts, and more especially it relates to transmission belts such as are used in connection with the type of transmission that employs two pairs of cone discs and an intermediate side driving belt. In this type of belt there is usually employed a series of transverse bars or links having sloped or inclined ends adapted for frictional engagement with complementally tapered faces of the cone pulleys, and it is to the improvement of the bars or links constituting the belt that this invention is directed.

The chief objects of the invention are to provide a side-driving belt of the character mentioned which may be easily and quickly repaired; which is simple and economical in construction in that it does not require the use of separate wear-plates on its driving surface; which will not slip on the pulleys; and which may be caused to engage the pulleys under tension, and which will maintain said tension. Further objects include facility of lengthening or shortening the belt; obviating the use of metal plates or hinge pins as a means for providing flexibility in the belt; to avoid friction between relatively moving units of the belt; and to provide a mechanical interlock between adjacent units of the belt. Other objects will be manifest in the following specification.

Of the accompanying drawings.

Figure 1:
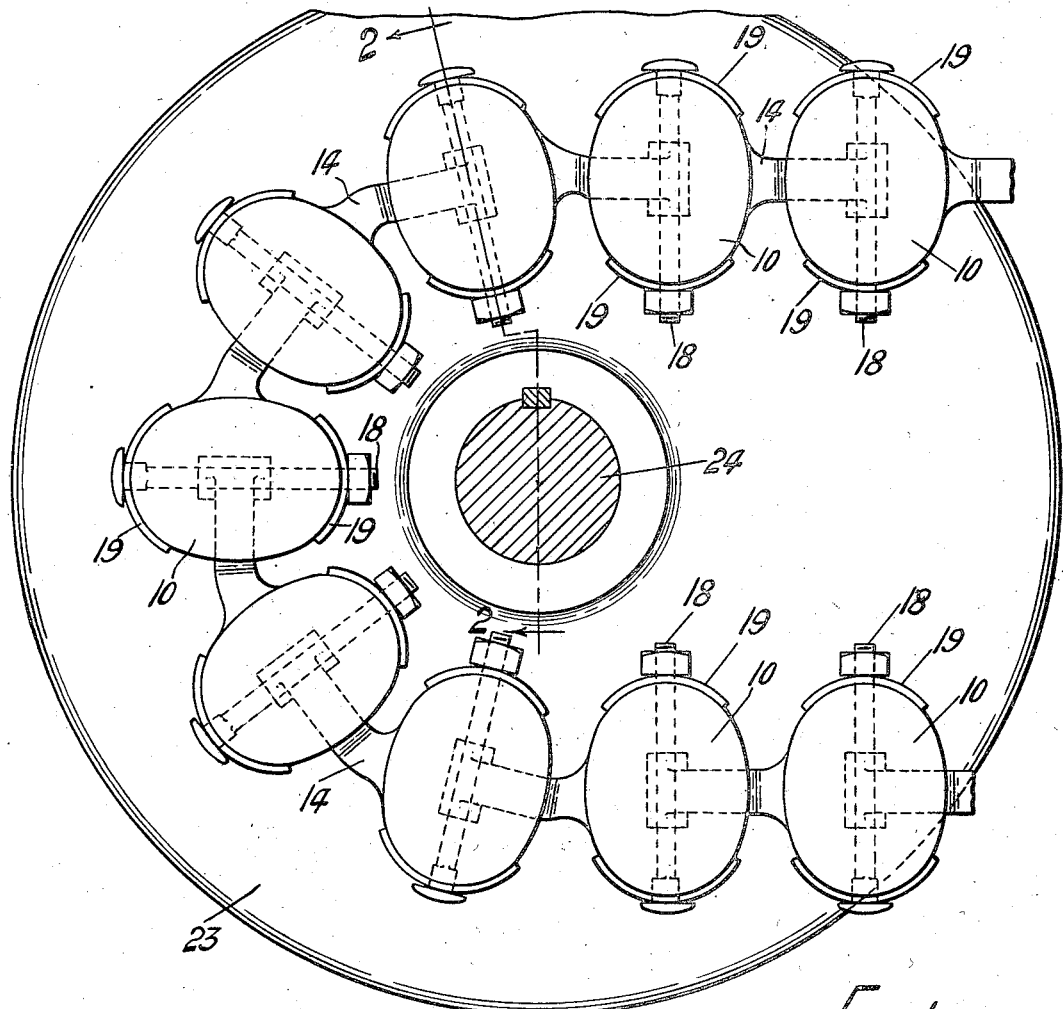
Figure 1 is a side elevation of a portion of the improved driving belt as it appears in the flexed position it assumes in passing about a cone pulley.

Referring to the drawings the improved belt comprises a series of links 10, 10, each of which is attached to an adjacent link by means of a flexible connection. Each of the links 10 is composed of tough, vulcanized rubber composition, and is generally elliptical in transverse section, the respective ends of the link being sloped or tapered as at 11, 11 in the direction of the long axis of the link-section, said taper being complemental to the taper of the cone pulleys by which the belt is driven. The belt is designed to be driven in the direction of the short axis of the link sections.

Figure 4:
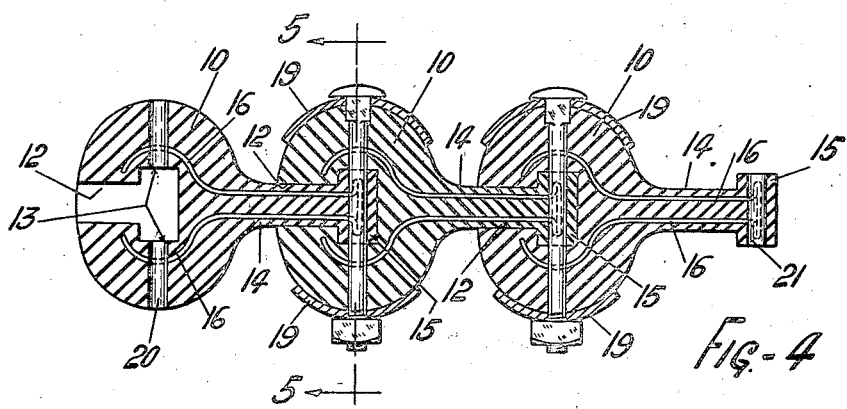
Figure 4 is a section on the line 4—4 of Figure 3.
Figure 5:
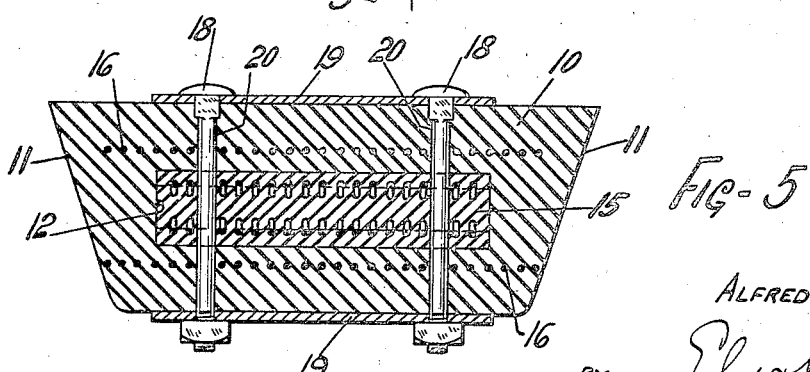
Figure 5 is a section on the line 5—5 of Figure 4.

As is most clearly shown in Figure 4, each link 10 is formed with a longitudinally disposed, elongate slot or recess 12 in one of its sides, said recess being in the plane of the short axis of the link, and being somewhat shorter than the link in length. The recess 12 extends inwardly to a point somewhat past the middle of the link, and at its inner end is somewhat enlarged to provide oppositely disposed undercut portions 13, 13. Diametrically opposite the recess 12 the link is formed with an integral, laterally projecting tongue 14 that is shaped complemental to the recess 12 so as to fit into the said recess in the adjacent link, the free margin of the tongue being enlarged as shown at 15 so as to seat within the undercut portions 13 of the recess 12, thus providing a mechanical interlock between links. The tongue 14 is of such length that when the links are assembled there are short sections of tongue exposed between adjacent links, thus permitting relative movement of adjacent links as the belt flexes in passing around a pulley. Preferably the tongue of the link is reinforced with suitable material such as the fabric 16, said fabric consisting of two, separated plies that extend about the inner, undercut portion 13 of the recess 12.

In addition to the mechanical interlock described, the links 10 are positively connected to each other by bolts 18, 18 that pass through each link parallel to the long axis thereof, said bolts passing through the enlarged portions 15 of the tongues 14 of adjacent links positioned in the middle of each link. There are two bolts 18 to each link, and said bolts serve to retain elongate metal plates 19, 19 on the respective upper and lower faces of the link, said plates being transversely arcuate, and disposed longitudinally of the link. The plates 19 serve as washers for the bolts, and also serve to impart longitudinal rigidity to the link. Suitable apertures 20, 21 may be molded in the link body and tongues respectively for receiving the bolts 18.

Figure 2:
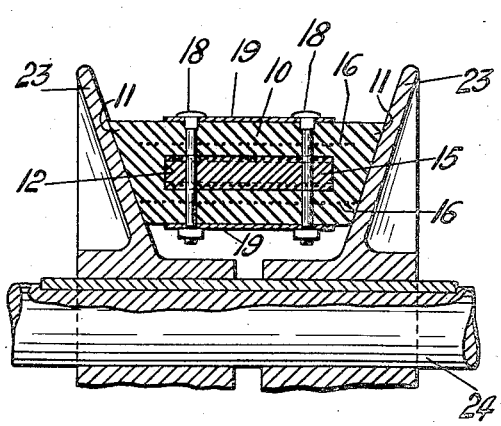
Figure 2 is a section on the line 2—2 of Figure 1, on a smaller scale.
Figure 3:
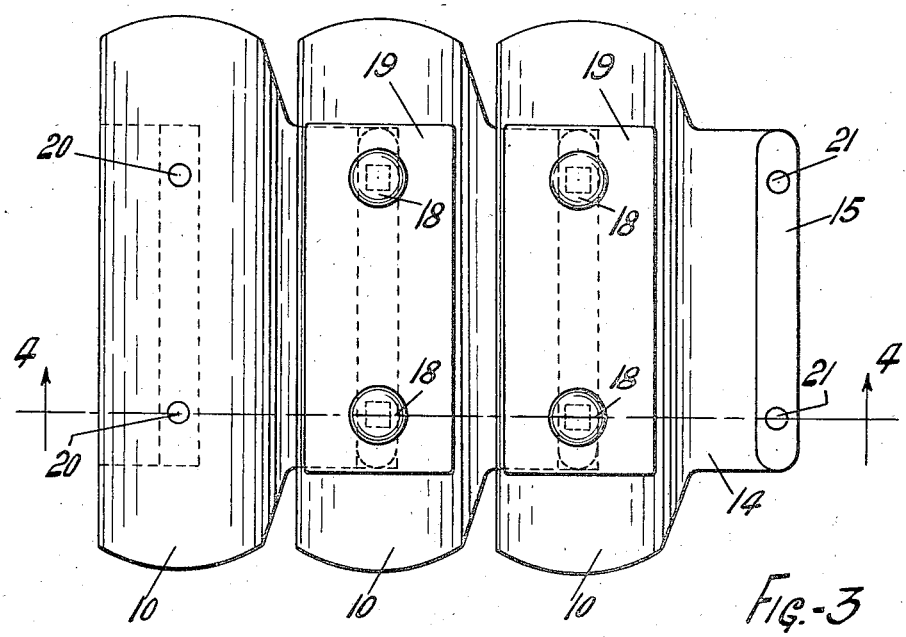
Figure 3 is a plan view of a short length of the belt showing several of the units or links thereof.

The links 10 are assembled as described to form an endless driving belt, a portion of which is shown in Figure 1. As shown in Figures 1 and 2, the belt is used in transmission devices comprising pairs of cone pulleys, such as the pulley cones 23, 23. The latter are slidably keyed on a rotatable shaft 24, and may be moved from and toward each other with the result that the belt-links will engage the pulleys at different distances from the axis thereof to provide different driving ratios, as is well-known to those skilled in this art.

Because of the rubber in the belt structure, it may be mounted upon the driving pulleys under slight tension so as to assure good driving friction. Breakage of the belt may be repaired by the replacement of a single link, and there is no friction between adjacent links, or of hinge pins, to cause wear. The use of rubber makes for quietness of operation, and there are no metal members that flex and thus fail from fatigue.

Modification may be resorted to without departing from the spirit of the invention or the scope of the appended claims.

What is claimed is:

1. An articulated driving belt comprising a plurality of separable, one-piece links, each link being formed on one side with an undercut recess, and formed on its opposite side with a flexible tongue adapted to seat in the recess of an adjacent link in interlocked relation with the link structure.

2. An articulated driving belt comprising a plurality of separable, one-piece links of flexible material, each link having a laterally extending tongue, and means for connecting said tongue to an adjacent link.

3. An articulated driving belt comprising a plurality of separable, one-piece links of flexible material, each link being formed with a laterally extending tongue, and means for connecting said tongue to an adjacent link including a mechanical interlock therewith.

4. A driving belt comprising a plurality of separable, one-piece links of flexible material, each link being formed with a laterally extending tongue, and means for connecting said tongue to an adjacent link consisting of a mechanical interlock of the tongue and link, and bolts extending through the latter and the tongue.

5. A driving belt comprising a plurality of separable, one-piece links of flexible material, each link having a laterally extending portion, means for connecting said laterally extending portion to an adjacent link, said means comprising bolts, and means longitudinally reinforcing the link retained thereon by said bolts.

6. An articulated driving belt comprising a plurality of separable, one piece links of flexible material, each link being formed on one side with a recess and on the opposite side with a laterally projecting tongue adapted to interfit with the recess of the adjacent link, and a flexible reinforcement within the link structure extending throughout the tongue portion and about said recess.

7. A driving belt comprising a plurality of separable, one piece links of flexible material, each link being formed with a recess on one side and a complementally shaped tongue on the other side adapted to engage in the recess of an adjacent link, flexible reinforcing in the tongue of the link, and rigid reinforcing for stiffening the link longitudinally.

8. An individual link for link belts, said link comprising a one-piece vulcanized rubber structure having sloped end walls, a recess in one lateral face, and a tongue extending laterally from the opposite lateral face.

9. An individual link for link belts, said link consisting of a one-piece vulcanized rubber structure having sloped end walls, a recess in one lateral face thereof, said recess having closed ends, and a tongue shaped complemental to said recess extending laterally from the opposite lateral face.

10. An individual link for link belts, said link consisting of a one-piece, transversely flexible, reinforced structure having sloped end walls, a recess in one lateral face thereof, and a tongue shaped complemental to said recess extending laterally from the opposite lateral face.

ALFRED J. WENDLING.